US006416877B1

United States Patent
Perrin et al.

(10) Patent No.: US 6,416,877 B1
(45) Date of Patent: Jul. 9, 2002

(54) FORMING A PLAIN BEARING LINING

(75) Inventors: Carl Perrin, Rugby; David Graham McCartney, Nottingham; Andrew John Horlock, Nottingham; Samuel James Harris, Nottingham; Andrew John Sturgeon, Cambridge, all of (GB)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/622,155

(22) PCT Filed: Mar. 12, 1999

(86) PCT No.: PCT/GB99/00748

§ 371 (c)(1),
(2), (4) Date: Oct. 20, 2000

(87) PCT Pub. No.: WO99/47723

PCT Pub. Date: Sep. 23, 1999

(30) Foreign Application Priority Data

Mar. 14, 1998 (GB) .............................................. 9805347
Mar. 14, 1998 (GB) .............................................. 9805353

(51) Int. Cl.[7] ........................ B32B 15/16; B32B 15/20; C23C 4/08; C23C 4/12; F16C 33/12
(52) U.S. Cl. ...................... 428/547; 428/553; 428/610; 428/654; 428/653; 428/937; 148/531; 148/535; 148/537; 427/448; 427/456; 427/383.7; 384/912
(58) Field of Search ................................ 428/547, 553, 428/937, 652, 653, 650, 654, 651, 610; 148/531, 537, 535; 427/448, 456, 427, 422, 383.7, 405; 384/912

(56) References Cited

U.S. PATENT DOCUMENTS

| 5,080,056 A | * | 1/1992 | Kramer et al. ............ 123/193 P |
| 5,626,674 A | * | 5/1997 | VanKuiken, Jr. et al. ... 118/317 |
| 6,165,286 A | * | 12/2000 | Bayer et al. ................. 148/220 |
| 6,221,504 B1 | * | 4/2001 | Pfeffinger et al. ........... 428/564 |

FOREIGN PATENT DOCUMENTS

| EP | 0825272 A2 | * | 2/1998 |
| GB | 0522448 | | 12/1938 |
| GB | 1083003 | | 10/1964 |
| GB | 1335961 | | 10/1969 |
| GB | 1531222 | | 9/1974 |
| GB | 2130250 | | 10/1983 |
| GB | 2273750 | | 6/1994 |

OTHER PUBLICATIONS

International Search Report for Application No. GB 9805347.3 dated Jul. 8, 1998.

* cited by examiner

Primary Examiner—John J. Zimmermann
(74) Attorney, Agent, or Firm—Rader, Fishman & Grauer PLLC

(57) ABSTRACT

A method of forming a plain bearing lining on a substrate, the method comprising high velocity oxy-fuel spraying particles of a bearing metal onto the substrate and treating said layer to form it into a lining.

20 Claims, 1 Drawing Sheet

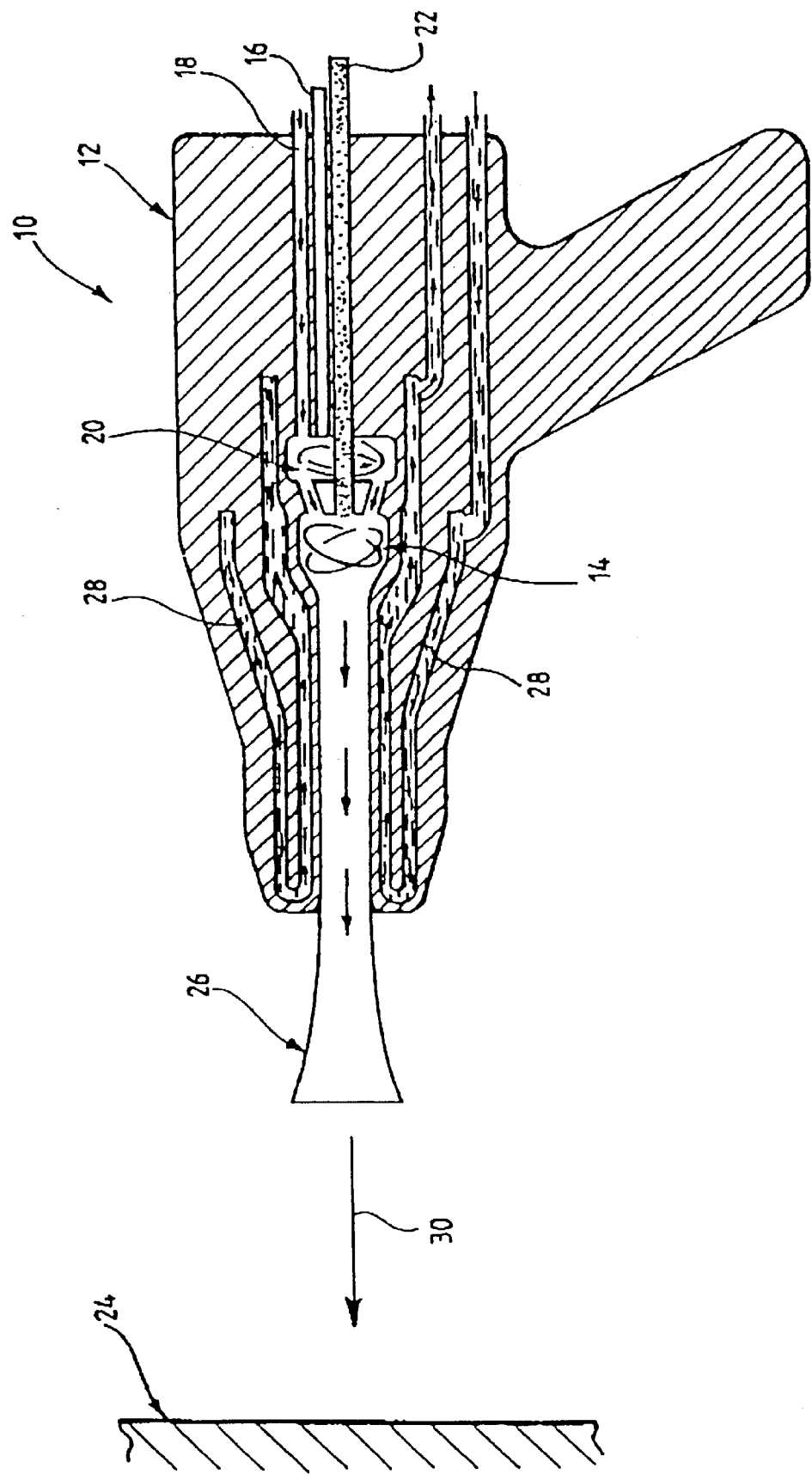

FORMING A PLAIN BEARING LINING

FIELD OF THE INVENTION

This present invention is concerned with a method of forming a plain bearing lining.

BACKGROUND OF THE INVENTION

Plain bearings are widely used for supporting rotating shafts, eg they are used for supporting the crank shafts of internal combustion engines. Such plain bearings have a lining which is formed front a soft metal, ie a metal having a hardness of less than 100 Hv. The soft metal is able to accommodate misalinements between the bearing and the shaft and, also, is able to cope with particles of dirt which become embedded in the Fecal rather than Scratching the shaft. Originally, the soft metal bearing lining was cast into a housing but now such bearing linings are normally applied to a strong backing support, eg of steel or bronze, by methods such as so-called roll-bonding, strip casting and sintering for example. Suitable metals for forming the lining include lead-based, tin-based and cadmium-based white metal alloys (Babbitt), copper-based alloys (particularly copper-lead and copper-lead-tin), and aluminium-based alloys (particularly aluminium-tin, aluminium-tin-copper, aluminium-silicon-tin, and aluminium-tin-copper-silicon alloys for example).

Conventionally, bearing linings made of aluminium-based alloys are applied to their backing support by roll bonding in strip form and are then formed into half-bearings and machined to their final shape. Other soft metal bearing linings are cast or sintered on to their support backing material. However, plain bearings made by these methods have limited strength and the application methods are complex. Furthermore, the methods employed for the manufacture of half-bearings arc not suitable for applying the bearing lining material directly to a component having a complex shape.

Attempts have been made in the prior art to employ physical vapour deposition spraying processes such as flame and plasma-arc spraying to deposit bearing lining materials, mainly aluminium-based, onto a backing substrate. However, such spraying processes have all suffered from the same disadvantages of high oxide content in the range of 10 to 20 weights due to oxidation of the molten or partially molten material and high levels of porosity in the region of 10 to 15°.

GB-A-1083003 is an example of one such process as described above and has the disadvantages described.

GB-A-2130250 is another example of a thermal spraying process but which also suffers from the disadvantages of high levels of oxidation and porosity.

Many of the prior spraying processes were attempts to overcome the particular segregation difficulties associated with the production by casting and roll-bonding of bearing linings comprising an aluminium matrix having particles of lead therein rather than for any intrinsic benefits that such deposition processes may have.

It is an object of the present invention to provide a method of forming a plain bearing lining which is simpler, produces stronger linings, and can be utilised to apply a lining directly to a component such as the bore of a connecting rod for an internal combustion engine for example.

BRIEF DESCRIPTION OF THE DRAWINGS

The FIGURE shows an HVOF spraying device according to the present invention.

DETAILED DESCRIPTION

According to a first aspect of the present invention, there is provided a method of forming a plain bearing lining on a substrate, the method comprising the steps of high velocity oxy-fuel spraying particles of a metal on to the substrate to form a layer and treating said layer to form it into a bearing lining.

The layer and substrate may be heat treated following deposition and prior to machining.

The lining may comprise a bearing alloy having a matrix formed from a metal having a hardness less than 100 Hv.

In the method according to the present invention, it has been found that plain bearing linings can be built-up by a simple method which can be applied to components having a complex shape and such linings are stronger than some conventional linings.

Suitable substrates may include flat strip such as steel or bronze strip for example, pre-formed half bearing shells, the bore of a connecting rod or crankcase block main bearing bores and the surface of shaft journals for example.

The substrates may comprise any suitable material such as steel, cast iron, titanium and its alloys, aluminium-based alloys, and copper-based alloys such as bronze for example.

Depending upon the initial substrate, the treatment to form the deposited material into a bearing lining may comprise at one extreme only machining to a desired thickness for example where the substrate is already in semi-circular form or forming a flat strip into a half bearing by known techniques at the other extreme.

High velocity oxy-fuel (HVOF) spraying is a technique which comprises introducing either liquid or gaseous fuel into a combustion chamber of a spraying device with oxygen where it is ignited. A material to be sprayed is fed into the combustion chamber where it melts or partially melts. The combustion gases intermixed with the molten or semi-molten material is then caused to flow through an elongate nozzle in which the mixture is accelerated to high velocity. The mixture impacts onto the substrate surface where the molten or semi-molten particles coalesce and build-up a layer.

HVOF spraying has been utilised for spraying a great variety of materials to provide relatively thin coatings. Most of the materials for which HVOF has been used have been relatively high melting point materials such as ceramics and high melting point metals such as ferrous alloys, cobalt and the like. The HVOF spraying devices available have not been designed for use with aluminium alloys or other similarly low melting point metals as they tend to clog the spraying device due to rapid melting. Thus, it is believed by the applicants that the HVOF technique has not previously been used for building up functional layers of soft metal for plain bearing linings which have thicknesses in the range from about 20 $\mu$m up to 500 $\mu$m or even 2 mm. We have found that typical bearing materials, including aluminium-based alloys, are not severely oxidised by the HVOF process and oxide content levels typically of 1 to 5% may be achieved. Furthermore, because of the high degree of kinetic energy imparted to the particles by the combustion and spraying process, porosity levels of only 1 to 2% may be achieved in the deposited metal. Particle velocities of up to 800 m/s are typical for HVOF compared with 40 to 100 m/s for flame and plasma arc spraying.

Due to the high porosity and oxide contents of prior art spraying processes, adhesion of the deposited layer to the substrate was poor at about 8 to 12 Mpa. Aluminium alloy bearing layers deposited by the HVOF process have achieved bond strengths of greater than 70 Mpa.

Thus, it may be seen that the method of the present invention has several important advantages over the known prior art spraying processes when applied to bearing materials.

In a method according to the invention, the matrix may contain a secondary phase comprising at least one further material which are sprayed on to the substrate with the matrix-forming particle. The further material may be an alloying addition such as a soft phase in the form of particles within the matrix, a strengthening material, a conformability improver, a friction reducing material, a wear improving addition such as particles of a ceramic for example. Deposits comprising pre-alloyed aluminium-tin powder with additions of up to 20 weight % alumina of particle size from 2 to 10 μm have been produced with a uniform dispersion of the alumina particles in the metal matrix.

Preferably, the matrix is an aluminium-based or a copper-based alloy. Suitable alloys are those used in the formation of conventional plain bearing linings such as Al—Sn, Al-12Sn—Cu, Al—Sn—Si—Cu and the like. The second phase may comprise at least one of copper, tin and silicon.

In the case of aluminium-based alloys containing a second phase of a soft material such as lead or tin for example, it is preferred that the powder feedstock material to the HVOF spraying device be in pre-alloyed form Tests have shown that a mixture of aluminium particles and tin particles for example tend to clog up the spraying device Keith the low melting point soft phase vaporising and being badly oxidised within the spraying device. The soft phase distribution was poor and composition control difficult to achieve. When the material is in the form of prealloyed particles, the soft low melting point phase is protected by the aluminium or aluminium alloy matrix. Furthermore, the corrosion resistance of the deposited coating is greatly improved in the case of aluminium alloys by the use of prealloyed powders. Copper-based alloys having a low melting point second phase such as lead for example are also similarly affected. However, other metal systems may be amenable to the use of elemental powders.

In a method according to the invention, it is, in some cases, possible to control the size of the second phase particles since, in the HVOF spraying step, the second phase particles may be retained in solid solution so that they can be precipitated to predetermined sizes by control of a heat treatment step The heat treatment for aluminium-based alloys may comprise heating to 250° C. to 450° C. for between half an hour and five hours for example. A typical heat treatment may involve heating to 300° C. for one hour. However, the precise heat treatment given will depend upon the particular material system in question, the HVOF method of deposition allowing more control over the final microstructure achieved.

Preferably, in a method according to the invention, the HVOF spraying step comprises bringing about repetitive relative movement between a spraying nozzle and the substrate, so that the substrate is repeatedly sprayed until the layer has the desired thickness, eg 20 to 2000 microns depending upon the application. The substrate may be a half-shell of a conventional thin-wall bearing or may be a surface of either of two parts which slide past one another. For example, the surface may be an outer surface portion of a shaft or an interior surface of the big end or the small end of a connecting rod, thus enabling a bearing lining to be applied directly to the connecting rod instead of inserting a shell bearing.

In a method according to the invention, the composition of the sprayed particles may be varied during the spraying step so that the layer sprayed has a composition which varies at different depths within the layer. For example, the layer may have a composition adjacent to the substrate which is easier to adhere to the substrate and/or is stronger and hence less easy to machine than the composition of the remainder of the layer The layer may, for example, be stratified comprising a lower stratum adjacent to the substrate and having a first composition, an upper stratum in which the first composition gradually gives way to the second composition.

In order that the present invention may be more fully understood, examples will now be described with reference to the accompanying drawing which shows a schematic representation of a HVOF spraying device showing the main features and principle of operation.

Referring now to the drawing and where a HVOF spraying device is indicated generally at 10. The device has a body 12, in this case a hand held pistol grip type body. Central to the operation of the device is a combustion chamber 14 where a mixture of fuel and oxygen are ignited. The device has a first conduit 16 for admitting oxygen and a second conduit 18 for admitting fuel; both conduits 16 and 18 are connected to a mixing chamber 20 where they are intimately mixed prior to passing into the combustion chamber 14. A third conduit 22 connected directly to the combustion chamber carries a supply of powder particles to be deposited on the substrate indicated generally at 24. The powder particles are conveyed by means of a carrier gas into the combustion chamber 14 The heat generated in the combustion chamber 14 by the burning fuel and oxygen causes the powder particles to melt or at least partially melt whereupon the combustion products are accelerated along the elongate nozzle 26 in a hypersonic exhaust gas stream to be ejected towards the substrate 24 where the molten and partially molten particles impact and adhere. The device 10 is also provided with a cooling system which in this case comprises a water conduit 28.

Typically the oxygen and fuel are injected into the device under a pressure of about 100 to 150 p.s.i. and at a high flow rate. The velocity of the particle carrying exhaust gas, indicated by the arrow 30 is typically 1800 m/s. The material to be deposited is introduced into a stream of carrier gas which carries powder into the HVOF device. The carrier gas may be argon or nitrogen for example. In the HVOF device shown), the powder is introduced directly into the combustion chamber, however, the powder may alternatively be introduced into the exhaust gas stream in the nozzle 26 by radial injectors for example downstream of the combustion chamber 14. The final temperature of the powder particles is a function of inter alia powder particle size, melting point, thermal conductivity, residence time in the hot gases and flame temperature. The process variables include fuel type, oxygen to fuel ratio, gas pressure and total gas flow rate (which determine the temperature, velocity and oxygen potential of the flame), chamber size and configuration, nozzle length and diameter, powder size distribution, powder feed rate, gun to substrate stand-off distance and surface speed of substrate relative to the spray.

Suitable fuel gases which have been used for the HVOF process include hydrogen, acetylene, ethylene, propylene, propane and methyl-acetylene-propadiene (MAPP).

Suitable liquid fuels may comprise paraffin. Typical flow rates may be in the range from about 0.2 to 0.4 l/min with oxygen at 700 to 900 l/min.

There are three potential areas where oxidation of the deposited material can occur during the HVOF process, these are: (i) in the combustion chamber and/or nozzle 14/26; (ii) in the free jet during flight 30; and, (iii) on the substrate 24 during cooling. In the first of these areas the oxygen/fuel ratio can be adjusted over a wide range for all fuels thus, the processing parameters can be adjusted to give minimum oxidation of aluminium alloys for example and which is a major advantage over the earlier flame or plasma spraying processes. In the second area we have found that the exhaust gas itself protects the material to a large extent and due to the high velocity of gas jet, the time of flight is relatively very short compared with other known processes. Oxidation of the material on the substrate during cooling is not a serious concern since the substrate is relatively massive thermally compared with the material spray and rapid solidification of the molten material occurs and which is quickly protected by further material being deposited. Furthermore, additional external cooling of the substrate may be employed. Indeed, one of the major advantages seen for the method of the present invention is the ability to produce so-called rapid solidification rate (RSR) structures to produce microstructures which are not possible by conventional casting, sintering, roll-bonding is methods. The high cooling rate influences the material properties promoting high degrees of supercooling, fine grain size, metastable phases, supersaturated solid solutions and amorphous phases. With the method of the present invention, the only post-deposition processes which may be necessary may be stress relieving heat treatments which also allows the production of extremely fine and controllable, by heat treatment time and temperature, distributions of a soft second phase for example. Normal post-deposition forming and machining operations will not affect the microstructure.

There now follows a detailed description of three illustrative examples of methods according to the invention.

In the first illustrative example, a plain bearing lining was formed on a substrate in the form of a forged steel connecting rod. Specifically, the lining was formed on the interior surface of the big end of the rod which had been roughened by shot-blasting to improve adhesion between the lining and the substrate.

In the first illustrative example, a layer was formed on said surface, the layer comprising a matrix formed from an aluminium-tin-copper alloy (12% by weight tin and 1% by weight copper) this metal having a hardness less than 100 Hv. In the method, particles of the metal in the size range between 40 and 110 microns were supplied to the combustion chamber of a HVOF spray gun which was operated at 35 kilowatts, 190 l/min of oxygen and 60 l/min of propylene fuel. The particles were partially melted and accelerated through the nozzle 26. Relative movement between the nozzle and the surface of the substrate was caused by rotating the substrate around the nozzle so that the spray swept repeatedly across the surface of the substrate at a speed of 15 metres per minute. The nozzle was at a distance of 0.285 metres from the surface. The particles coalesced on the surface and built up a layer 500 $\mu$m thick. The illustrative example also comprised machining said layer to form it into a lining.

In the second illustrative example, the first illustrative example was repeated except that the composition of the sprayed particles was varied during the spraying step Initially, a lower stratum 50 microns in thickness was laid down directly on the substrate, the composition of the lower stratum consisting of Al-11Si—Cu alloy. Next, a transitional stratum was applied on top of the lower stratum by altering the composition of the particles in the spray while spraying continued. In the transitional stratum the proportion of Al-1Si—Cu alloy in the composition was gradually reduced and replaced by Al-12Sn—Cu alloy so that, when the transitional stratum was 150 microns thick, the composition was entirely Al-12Sn—Cu alloy. Spraying then continued building up an upper stratum 200 microns thick formed from the Al-12Sn—Cu alloy. Thus, the layer sprayed has a composition which varies at different depths within the layer Machining reduced the thickness of the upper stratum to 50 microns.

In a third example further tests were conducted using aluminium alloy particles as described with respect to the first example but using a liquid fuel comprising paraffin. A typical example with which tests have been conducted utilised a flow rate of 0.31 l/min of paraffin with a flow rate of 829 l/min of oxygen with a stand-off distance of 0.35 m. The deposits made with the liquid fuel possessed lower porosity and lower oxide contents than with gas fuel. Furthermore, deposition rates were higher than with gas fuel. A further apparent advantage of liquid fuel is there is no requirement to dilute the gas fuel/oxygen with nitrogen to prevent overheating of the powder as occurs with gas fuel in the absence of diluent gas such as nitrogen or argon.

Although the three illustrative examples given above utilise aluminium-based alloys for the deposited layers, it would be possible co deposit distinct layers of material at accurately controlled thickness consisting of different s base alloy systems such as for example a relatively strong copper-lead-tin alloy onto a steel substrate then a layer of aluminium or aluminium alloy having a high tin content in the range of 30 to 60 weight % for example. The individual layers themselves may be of graded composition to make best use of the strength and bearing properties at any given level as appropriate.

What is claimed is:

1. A method of forming a plain bearing lining on a substrate, the method comprising the steps of:

depositing an aluminum-based material having a second phase of a soft metal onto a substrate by the technique of high-velocity oxy-fuel spraying particles of the aluminum based material so as to form a layer on said substrate; and heat treating the deposited layer at a temperature of between about 250° C. and 450° C. for a time of between about 30 minutes and 5 hours, causing precipitation of said second phase soft metal and controlling the size of said second phase.

2. A method according to claim 1, wherein the soft metal second phase is one of tin and lead.

3. A method according to claim 1, wherein the substrate is selected from the group consisting of: a flat strip, preformed half bearing shells, an engine connecting rod, crankcase block main bearing bores, and the surface of shaft journals.

4. A method according to claim 1, wherein the substrate material is selected from the group consisting of: steel, cast iron, titanium, titanium-based alloys, aluminum, aluminum-based alloys, copper, and copper-based alloys.

5. A method according to claim wherein the aluminum-base material deposit further includes an addition of up to 20 wt % alumina.

6. A method according to claim 1, wherein the aluminum-based material and second phase soft metal being deposited are in the form of a pre-alloyed powder.

7. A method according to claim 1, wherein the aluminum-based material being deposited is selected from the group consisting of: Al—Sn, Al—Sn—Cu, Al—Sn—Si—Cu, and Al—Sn—Si.

8. A method according to claim 1, wherein the thickness of the deposited material is in the range of about 20μm to 2 mm.

9. A method according to claim 8, wherein the maximum thickness of the deposited material is 500 μm.

10. A method according to claim 1, wherein the porosity of the deposited material is less than about 2%.

11. A method according to claims 1, wherein the composition of the sprayed material is varied during the spraying step so that the layer sprayed has a composition that varies at different depths within the layer.

12. A method according to claim 1, wherein the layer is machined after deposition and heat treatment.

13. A method of forming a plain bearing lining on a substrate, the method comprising the steps of:

selecting an aluminum-based material having a second phase of soft metal from the group consisting of: Al—Sn, Al—Sn—Cu, Al—Sn—Si—Cu, and Al—Sn—Si to be fed into a spraying device;

selecting a substrate material from the group consisting of: steel, cast iron, titanium, titanium-based alloys, aluminum, aluminum-based alloys, copper, and copper-based alloys to receive the aluminum based material;

depositing the selected aluminum-based material onto the substrate by the technique of high-velocity oxy-fuel spraying particles of the aluminum based material so as to form a layer on said substrate;

varying the composition of the sprayed material during the spraying step so that the layer sprayed has a composition that varies at different depths within the layer; and heat treating the deposited layer at a temperature of between about 250° C. and 450° C. for a time of between about 30 minutes and 5 hours, causing precipitation of said second phase soft metal and controlling the size of said second phase.

14. A method according to claim 13, wherein the thickness of the deposited material is in the range of about 20 μm to 2 mm.

15. A method according to claim 14, wherein the maximum thickness of the deposited material is 500 μm.

16. A method according to claim 13, wherein the layer is machined after deposition and heat treatment.

17. A bearing material comprising an aluminum-based alloy lining deposited onto a substrate by high-velocity oxy-fuel deposition, the lining comprising a lower stratum of an alloy of composition in weight percentage Al-11Si-1Cu adjacent said substrate; a transitional stratum on top of said lower stratum, said transitional stratum comprising a decreasing proportion of Al-11Si-1Cu alloy and an increasing proportion of Al-12Sn-1Cu; and an upper stratum on top of said transitional stratum, said upper stratum comprising Al-12Sn-1Cu alloy.

18. A bearing material according to claim 13, wherein the transitional stratum comprises 100% of Al-11Si-1Cu alloy at the interface with the lower stratum and 100% of Al-12Sn-1Cu alloy at the interface with the upper stratum.

19. A bearing material according to claim 13, wherein the lower stratum is about 50 μm in thickness; the transitional stratum is about 150 μm in thickness and the upper stratum is about 200 μm in thickness as deposited.

20. A bearing material according to claim 15, wherein the upper stratum is machined back to about 50 μm in thickness.

* * * * *

UNITED STATES PATENT AND TRADEMARK OFFICE
CERTIFICATE OF CORRECTION

PATENT NO. : 6,416,877 B1
DATED : July 9, 2002
INVENTOR(S) : Carl Perrin et al.

It is certified that error appears in the above-identified patent and that said Letters Patent is hereby corrected as shown below:

Column 6,
Line 43, replace "250° C. and 450°C." with -- 250°C and 450°C --.
Line 58, replace "according to claim" with -- according to claim 1 --.

Column 7,
Line 8, replace "according to claims 1" with -- according to claim 1 --.

Column 8,
Line 2, replace "250°C." and 450°C." with -- 250°C and 450°C --.

Signed and Sealed this

Twenty-eighth Day of January, 2003

JAMES E. ROGAN
*Director of the United States Patent and Trademark Office*